United States Patent
Jung

(10) Patent No.: US 8,097,977 B2
(45) Date of Patent: Jan. 17, 2012

(54) MULTI-OUTPUT POWER SUPPLY DEVICE

(75) Inventor: Jee-hoon Jung, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/805,678

(22) Filed: Aug. 12, 2010

(65) Prior Publication Data

US 2010/0308656 A1     Dec. 9, 2010

Related U.S. Application Data

(63) Continuation of application No. 12/023,226, filed on Jan. 31, 2008, now Pat. No. 7,791,222.

(30) Foreign Application Priority Data

Jun. 15, 2007 (KR) .................................. 2007-59126

(51) Int. Cl.
*H02J 3/00* (2006.01)
*G05F 1/10* (2006.01)

(52) U.S. Cl. ................. 307/17; 307/32; 307/98; 307/99; 307/126; 307/129

(58) Field of Classification Search .................... 307/17, 307/32, 98, 99, 126, 129
See application file for complete search history.

(56) References Cited

U.S. PATENT DOCUMENTS 5,453,678 A * 9/1995 Bertolini et al. ............... 323/282

FOREIGN PATENT DOCUMENTS

JP          08080037 A   *  3/1996
JP     2001320253 A   * 11/2001

OTHER PUBLICATIONS

U.S. Appl. No. 12/023,226, filed Jan. 31, 2008, Jee-Hoon Jung, Samsung Electronics Co., LTD.
Notice of Allowance dated Apr. 22, 2010 for related U.S. Appl. No. 12/023,226.

* cited by examiner

*Primary Examiner* — Rexford Barnie
*Assistant Examiner* — Hal Kaplan
(74) *Attorney, Agent, or Firm* — Staas & Halsey LLP

(57) ABSTRACT

A multi-output power supply device includes a first power switch, a first switch controller that controls the first power switch, a transformer that transforms a power supplied from the first power switch, first through Nth output circuits connected to a secondary side of the transformer, where N is a positive integer greater than 1, a second power switch that switches the power output from one of the first through Nth output circuits, a second switch controller that controls the second power switch, a feedback circuit that feeds back output voltages of the first through Nth output circuits, and a feedback compensation circuit that performs a switching operation complementarily with the second power switch to compensate for a resistance of the feedback circuit. Accordingly, when power output to one of the output circuits is blocked, the multi-output power supply device can stably control the power output to the other output circuits.

10 Claims, 3 Drawing Sheets

MULTI-OUTPUT POWER SUPPLY DEVICE

CROSS-REFERENCE TO RELATED APPLICATIONS

This application claims the benefit of Korean Application No. 2007-59126, filed Jun. 15, 2007, in the Korean Intellectual Property Office, the disclosure of which is incorporated herein by reference. This application is a continuation application of U.S. application Ser. No. 12/023,226 filed Jan. 31, 2008 now U.S. Pat. No. 7,791,222, now allowed and incorporated by reference herein.

BACKGROUND OF THE INVENTION

1. Field of the Invention

Aspects of the present invention relate to a multi-output power supply device, and more particularly, to a multi-output power supply device which, when power supplied to one output circuit of multiple output circuits is blocked, stably controls power output to other output circuits of the multiple output circuits.

2. Description of the Related Art

To obtain multiple output voltages from a low-capacity power supply device, a single converter using a single transformer is widely used to generate the multiple output voltages. Since the single converter only uses a single controller, the single converter employs a multi-output sensing (or feedback) circuit that observes and controls output of the multiple output voltages. However, when the feedback circuit is used for a power supply device that is able to switch off some of the multiple output voltages in order to reduce use of standby power during a standby mode, voltages of non-switched off output voltages cannot be controlled within a desired range.

FIG. 1 is a block diagram of a typical multi-output power supply device. Referring to FIG. 1, power is provided to a transformer 14 according to a switching operation of a first power switch 10 that is controlled by a first switch controller 12. The transformer 14 transforms the provided power according to its turn ratio and outputs a transformed power to a first output circuit 16 and a second output circuit 18. If required, the typical multi-output power supply device can have additional output circuits similar to the first output circuit 16 and a second output circuit 18 shown.

The first output circuit 16 outputs the transformed power supplied from the transformer 14 to a subsidiary load 24 and the second output circuit 18 outputs the transformed power to a second power switch 20 that switches the transformed power to a main load 26 according to a control of the second power switch 20. The respective transformed powers output from the first and second output circuits 16 and 18 pass through a feedback circuit 28 and are fed back as signals for controlling the first switch controller 12.

Power switching-off at a secondary side of the transformer 14 is used to restrain unnecessary load power consumption in or during the standby mode. In the standby mode, a standby mode controller of the subsidiary load 24 turns off the second power switch 20 to restrain power supply to the main load 26. Furthermore, in the standby mode, a value of the subsidiary load 24 is also minimized by a system power sequence, and the typical multi-output power supply device operates with the standby mode controller as a central element that senses an external interrupt to detect when the standby mode is converted into a normal mode.

When the typical multi-output power supply device is controlled using a single controller, however, an output voltage of a switched off output circuit from among the multiple output circuits of the power supply device cannot be observed (or determined) so that an error in controlling of the other output voltages is increased. This causes an output voltage error to deteriorate control characteristics of the typical multi-output power supply device and to excessively increase the output voltage of the power supply devices so as to destroy a load.

SUMMARY OF THE INVENTION

Aspects of the present invention provide a multi-output power supply device which, when power applied to one output circuit of the multiple output circuits is blocked, stably controls power output to remaining output circuits of the multiple output circuits.

According to an aspect of the present invention, a multi-output power supply device includes: a first power switch to perform a switching operation of a power supply; a first switch controller to control the first power switch; a transformer to transform the power supplied from the first power switch; first through Nth output circuits connected to a secondary side of the transformer, where N is a positive integer greater than 1; a second power switch to switch the power output from one of the first through Nth output circuits; a second switch controller to control the second power switch; a feedback circuit to feed back output voltages of the first through Nth output circuits; and a feedback compensation circuit to perform a switching operation complementarily with the second power switch to compensate for a resistance of the feedback circuit.

According to an aspect of the present invention, the feedback circuit includes a plurality of resistors to observe the output voltages of the first through Nth output circuits, and the feedback compensation circuit may be connected in parallel with one of the plurality of resistors.

According to an aspect of the present invention, the feedback circuit includes a reference resistor, and the feedback compensation circuit may be connected in parallel with the reference resistor.

According to an aspect of the present invention, the feedback compensation circuit may comprise a compensation switch to perform an off switching operation if the second power switch is on and carry out an on switching operation if the second power switch is off, and a compensation resistor serially connected to the compensation switch.

According to an aspect of the present invention, a multi-output power supply device includes a first power switch to perform a switching operation of a power supply, a first switch controller to control the first power switch; a transformer to transform the power supplied from the first power switch; first through Nth output circuits connected to a secondary side of the transformer, wherein N is a positive integer greater than 1; a second power switch to switch the power output from one of the first through Nth output circuits; a second switch controller to control the second power switch; a feedback circuit to feed back output voltages of the first through Nth output circuits, the feedback circuit containing a reference resistor and a plurality of resistors corresponding to the first through Nth output circuits; and a feedback compensation circuit to perform an opposite switching operation relative to the second power switch to compensate for a resistance of the feedback circuit.

According to an aspect of the present invention, a multi-output power supply device includes a first output circuit to output a first output voltage using an input voltage; a second output circuit to output a second output voltage using the input voltage; a power switch to control supply of the second output voltage to a load; a feedback circuit to output a signal used to control supply of the input voltage using the first output voltage received from the first output circuit and the second output voltage selectively received from the power switch; and a feedback compensation circuit to compensate for a resistance of the feedback circuit when the second output voltage is not received from the power switch.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which

DETAILED DESCRIPTION OF THE PREFERRED EMBODIMENTS

Figure 1:
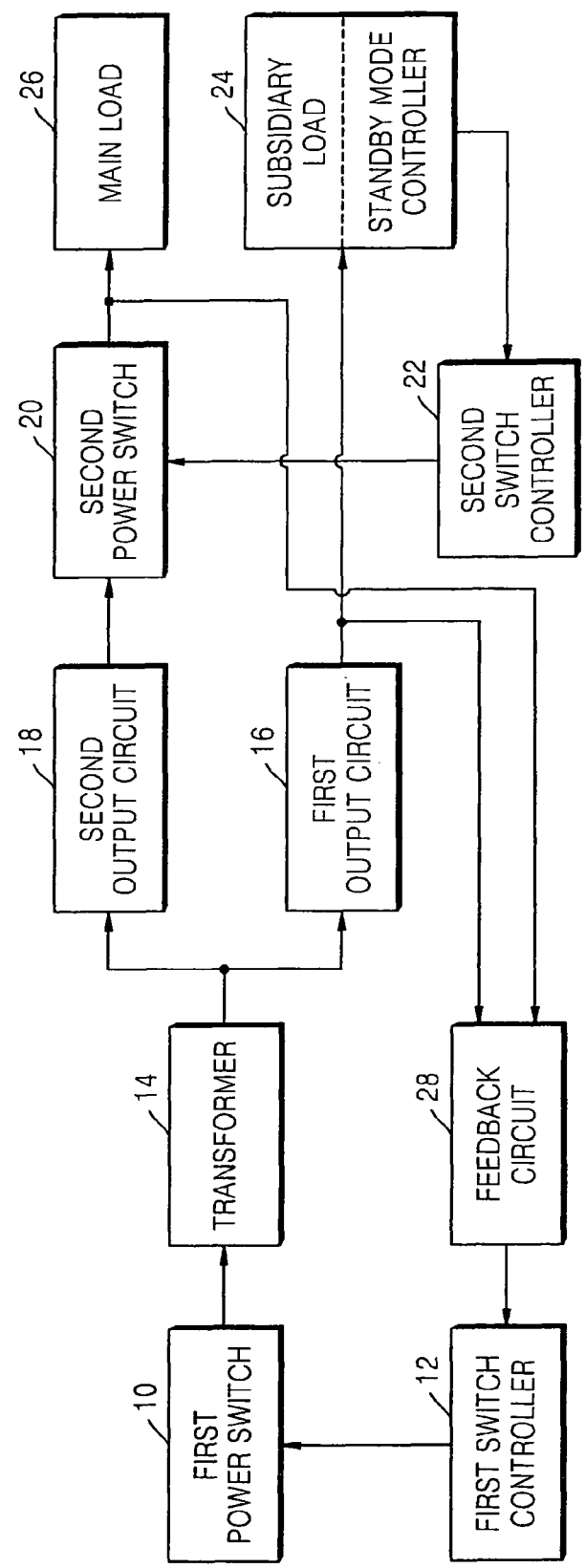
FIG. 1 is a block diagram of a typical multi-output power supply device.

Reference will now be made in detail to aspects of the present invention, examples of which are illustrated in the accompanying drawings, wherein like reference numerals refer to the like elements throughout. The aspects are described below in order to explain the present invention by referring to the figures.

Figure 2:
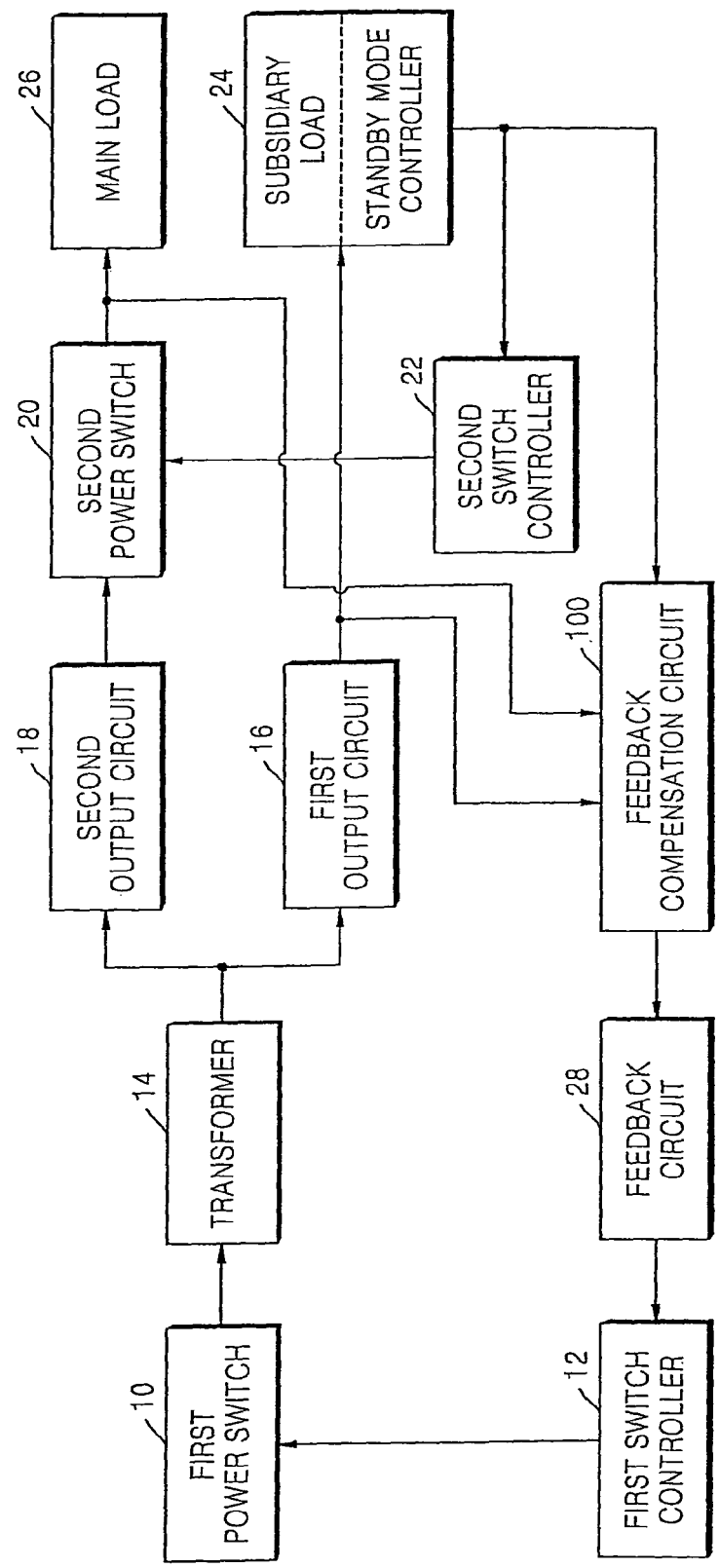
FIG. 2 is a block diagram of a multi-output power supply device according to an aspect of the present invention.

FIG. 2 is a block diagram of a multi-output power supply device according to an aspect of the present invention. Referring to FIG. 2, the multi-output power supply device includes a first power switch 10 that switches a supply of power, a first switch controller 12 that controls the first power switch 10, a transformer 14 that transforms the power supplied from the first power switch 10, a first output circuit 16 and a second output circuit 18 that are connected to a secondary side of the transformer 14, a second power switch 20 that switches a supply of power output from the second output circuit 18, a second switch controller 22 that controls the second power switch 20, and a feedback circuit 28 that feeds back output voltages of the first and second output circuits 16 and 18. In aspects of the present embodiment, though the multi-output power supply device is shown having the first and second output circuits 16 and 18, aspects of the present invention are not limited thereto. That is, the multi-output power supply device can include a plurality of output circuits (i.e., N output circuits, where N is a natural number greater than 1). The aforementioned components of the multi-output power supply device are identical to those of the typical multi-output power supply device illustrated in FIG. 1 so that detailed explanations thereof are omitted.

Unlike the typical multi-output power supply device illustrated in FIG. 1, the multi-output power supply device according to an aspect of the present invention further includes a feedback compensation circuit 100 to compensate for a resistance of the feedback circuit 28. Thus, the feedback compensation circuit 100 and the second power switch 20 complementarily perform switching operations, as further described below.

Figure 3:
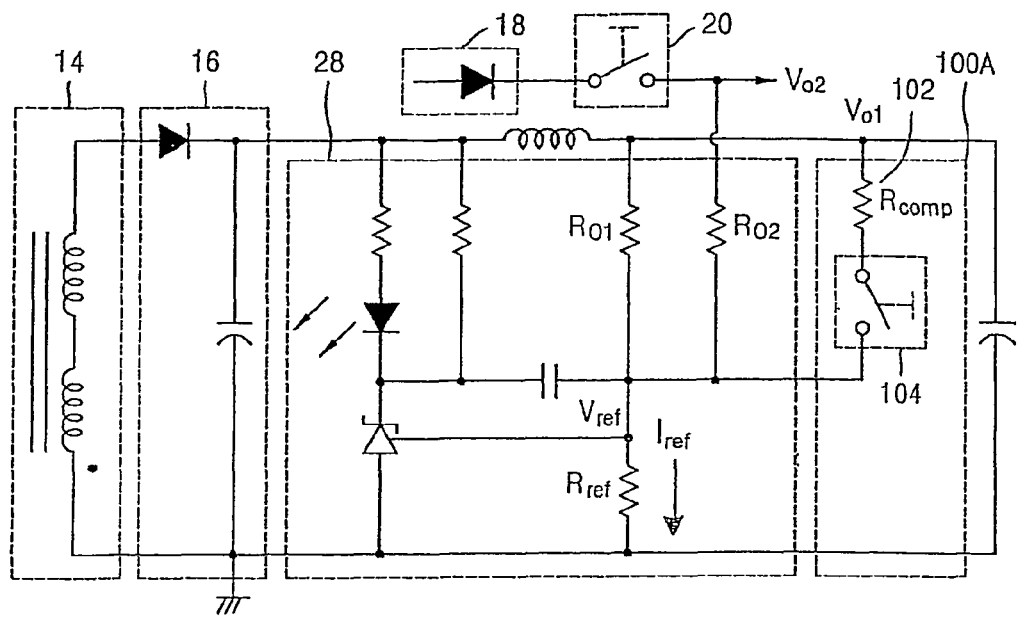
FIG. 3 is a circuit diagram of a multi-output power supply device according to an aspect of the present invention that includes an aspect of a feedback compensation circuit illustrated in FIG. 2.

FIG. 3 is a circuit diagram of a multi-output power supply device according to an aspect of the present invention that includes an aspect of the feedback compensation circuit 100 illustrated in FIG. 2. Referring to FIG. 3, a feedback compensation circuit 100A is connected in parallel with a resistor $R_{01}$ used to observe (or detect) an output voltage $V_{01}$ of the first output circuit 16. The resistor $R_{01}$ is included in the feedback circuit 28.

The feedback compensation circuit 100A includes a compensation resistor $R_{comp}$ 102 and a compensation switch 104 such that the compensation resistor $R_{comp}$ is serially connected to the compensation switch 104. The compensation switch 104 performs an off switching operation if the second power switch 20 is on, and carries out an on switching operation if the second power switch 20 is off.

When a system employing the multi-output power supply device of FIG. 3 is in a normal operation mode, the second power switch 20 maintains an on state and the compensation switch 104 performs the off switching operation. Accordingly, the feedback compensation circuit 100A does not operate. If the system is in a standby mode, the second power switch 20 is converted into an off state and the compensation switch 104 performs the on switching operation. Accordingly, the observation resistor $R_{01}$ and the compensation resistor $R_{comp}$ are connected in parallel to each other, and thus, an impedance (or resistance) for observing an output voltage $V_{01}$ of the first output circuit 16 is compensated, and then, an output voltage of the multi-output power supply device is uniformly maintained. Consequently, a voltage error observed by the feedback circuit 28 due to erroneous feed back of the output voltage $V_{01}$ from the first output circuit 16, which is caused by the switching-off of the second output circuit 18, can be compensated. That is, a voltage error, observed by a feedback circuit due to an erroneous feed back of an output voltage from a non switched off output circuit that is caused by a switched off output circuit, can be compensated. In various aspects, one or more of the output circuits may be switched off in the standby mode.

In the aspect shown in FIG. 3, if values of the resistor $R_{01}$ for observing the output voltage $V_{01}$ of the first output circuit 16, a resistor $R_{02}$ for observing the output voltage $V_{02}$ of the second output circuit 18, and a reference resistor $R_{ref}$ for a reference voltage $V_{ref}$ for the feedback circuit 28, have values represented by Equation 1, the value of the compensation resistor $R_{comp}$ is determined by Equation 2.

$$R_{01} = \frac{(V_{01} - V_{ref})R_{ref}}{XV_{ref}}, \quad R_{02} = \frac{(V_{02} - V_{ref})R_{ref}}{(1-X)V_{ref}} \quad \text{[Equation 1]}$$

Here, X denotes a feedback weight factor, and $I_{ref}$ is a value a value of a reference current of the feedback circuit 28.

$$R_{comp} = \frac{(V_{01} - V_{ref})R_{01}}{R_{01}I_{ref} - V_{01} + V_{ref}} \quad \text{[Equation 2]}$$

Figure 4:
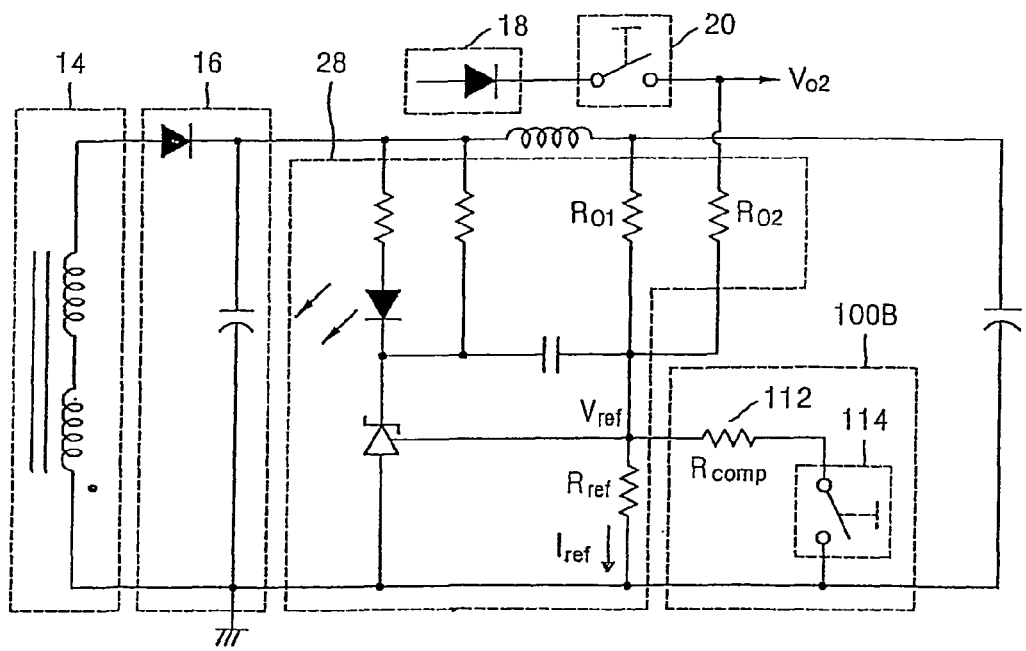
FIG. 4 is a circuit diagram of a multi-output power supply device according to another aspect of the present invention that includes an aspect of the feedback compensation circuit illustrated in FIG. 2.

FIG. 4 is a circuit diagram of a multi-output power supply device according to an aspect of the present invention that includes an aspect of the feedback compensation circuit 100 illustrated in FIG. 2. Referring to FIG. 4, a feedback compensation circuit 100B is connected in parallel with a reference resistor $R_{ref}$ of the feedback circuit 28 that includes a compensation resistor $R_{comp}$ 112 and a compensation switch 114.

The compensation resistor $R_{comp}$ 112 is serially connected to the compensation switch 114 that performs an off switching operation when the second power switch 20 is on, and carries out an on switching operation when the second power switch 20 is off.

If a system employing the multi-output power supply device is in a normal operation mode, the second power switch 20 is in on state and the compensation switch 114 performs the off switching operation, and thus, the compensation circuit 114 does not operate. If the system is in a standby mode, the second power switch 20 is converted into an off state and the compensation switch 114 performs the on switching operation. Accordingly, the reference resistor $R_{ref}$ and the compensation resistor $R_{comp}$ are connected in parallel with each other, and thus, a reference impedance (or resistance) for an output voltage $V_{01}$ from the first output circuit 16 is compensated, and thereby the output voltage of the multi-output power supply device is uniformly maintained.

If a resistor $R_{01}$, for observing the output voltage of the first output circuit 16, has the value represented by Equation 1, then a value of the compensation resistor $R_{comp}$ is determined by Equation 3.

$$R_{comp} = \frac{R_{01} R_{ref}}{\left|\frac{V_{01}}{V_{ref}} - 1\right| R_{ref} - R_{01}} \quad \text{[Equation 3]}$$

The aforementioned multi-output power supply device is used for image forming apparatuses including printers, scanners and multi-function peripherals. In other aspects, other devices that use different voltages among its subcomponents may use the aforementioned multi-output power supply device.

The multi-output power supply device according to an aspect of the present invention can compensate for a voltage error observed by a feedback circuit when power output to one output circuit of multiple output circuits is blocked, and thus, stably control power output to other output circuits of the multiple output circuits.

In FIGS. 3 and 4, the reference resistor $R_{ref}$ is connected between the observation resistors $R_{01}$, $R_{02}$, and a ground. Accordingly, in FIG. 3, the feedback compensation circuit 100A is connected in parallel with the observation resistors $R_{01}$ of the feedback circuit 28. On the other hand, in FIG. 4, the feedback compensation circuit 100B is connected in parallel with the reference resistor $R_{ref}$ of the feedback circuit 28.

Although a few aspects of the present invention have been shown and described, it would be appreciated by those skilled in the art that changes may be made in the aspects without departing from the principles and spirit of the invention, the scope of which is defined in the claims and their equivalents.

What is claimed is:

1. A method of controlling a plurality of output voltages in a multi-output power supply device for generating a plurality of output powers by using a transformer, the method comprising:
   if a system to which power is supplied from the multi-output power supply device is in a standby mode, blocking any one of at least two output powers of a secondary side of the transformer, wherein an unblocked output power is supplied to the system; and
   compensating for a resistance of a feedback circuit connected to a switching controller of a power switch of a primary side of the transformer, the resistance coupled to one or more unblocked output powers of the transformer, and maintaining the output voltage of the unblocked output power to be constant.

2. The method of claim 1, wherein, in the compensating for the resistance of the feedback circuit, if the system enters the standby mode from a normal operation mode, connecting a predetermined compensation resistor in parallel to any one of a plurality of resistors of the feedback circuit.

3. The method of claim 2, wherein the plurality of resistors of the feedback circuit comprises an observing resistor to observe the unblocked output power and a reference resistor of the feedback circuit.

4. The method of claim 3, wherein, in the compensating for the resistance of the feedback circuit, if the system enters the normal operation mode from the standby mode, connecting the predetermined compensation resistor in parallel to the observing resistor or the reference resistor.

5. The method of claim 1, wherein, in the blocking of any one of at least two output powers and the connecting of the predetermined compensation resistor in parallel to any one of the plurality of resistors of the feedback circuit, a switch to block any one of at least two output power and a switch to connect the predetermined compensation resistor in parallel to any one of the plurality of resistors of the feedback circuit are complementarily switched by a standby mode signal output from the system.

6. An image forming apparatus comprising:
   an image forming unit to form an image in the image forming apparatus; and
   a multi-output power supply device to supply a plurality of powers to the image forming unit, wherein the multi-output power supply comprises:
   a first output circuit to output a first output voltage using an input voltage;
   a second output circuit to output a second output voltage using the input voltage;
   a power switch to control supply of the second output voltage to a load;
   a feedback circuit to output a signal used to control supply of the input voltage using the first output voltage received from the first output circuit and the second output voltage selectively received from the power switch; and
   a feedback compensation circuit to compensate for a resistance of the feedback circuit when the second output voltage is not received from the power switch.

7. The image forming apparatus of claim 6, wherein the feedback circuit comprises a reference resistor and a resistor that corresponds to the first output circuit.

8. The image forming apparatus of claim 7, wherein the feedback compensation circuit is connected in parallel to the resistor that corresponds to the first output circuit or the reference resistor.

9. The image forming apparatus of claim 8, wherein the feedback compensation circuit comprises:
   a compensation switch; and
   a compensation resistor serially connected to the compensation switch, and the compensation resistor is connected in parallel to the resistor that corresponds to the first output circuit or the reference resistor.

10. The image forming apparatus of claim 6, wherein the feedback compensation circuit comprises:
    a compensation switch; and
    a compensation resistor serially connected to the compensation switch.

* * * * *